United States Patent [19]

Rohwer

[11] Patent Number: 5,241,663
[45] Date of Patent: Aug. 31, 1993

[54] HIERARCHICALLY PAIRING MEMORY BLOCKS BASED UPON RELATIVE STORAGE CAPACITIES AND SIMULTANEOUSLY ACCESSING EACH MEMORY BLOCK WITHIN THE PAIRED MEMORY BLOCKS

[75] Inventor: Thomas A. Rohwer, Sunnyvale, Calif.

[73] Assignee: Sony Corporation, Shinagawa, Japan

[21] Appl. No.: 531,001

[22] Filed: May 31, 1990

[51] Int. Cl.[5] .................... G06F 12/00; G06F 12/08
[52] U.S. Cl. .................... 395/425; 395/800; 364/966.2; 364/966.4; 364/964.34; 364/964.33; 364/DIG. 2
[58] Field of Search .................... 395/800, 425, 400

[56] References Cited

U.S. PATENT DOCUMENTS

| Re. 31,318 | 7/1983 | Kaufman et al. | 395/425 |
|---|---|---|---|
| 4,342,079 | 7/1982 | Stewart et al. | 395/425 |
| 4,432,055 | 2/1984 | Salas et al. | 395/400 |
| 4,511,964 | 4/1985 | Georg et al. | 395/400 |
| 4,654,787 | 3/1987 | Finnell et al. | 395/425 |
| 4,713,759 | 12/1987 | Yamagishi et al. | 395/425 |
| 4,772,948 | 9/1988 | Irvin | 358/139 |
| 4,780,755 | 10/1988 | Knierim | 358/10 |
| 4,908,789 | 3/1990 | Blokkum et al. | 395/425 |
| 4,980,850 | 12/1990 | Morgan | 395/425 |
| 5,047,920 | 9/1991 | Funabashi | 395/425 |
| 5,093,809 | 3/1992 | Schmitt-Landsiedel et al. | 365/230.03 |

FOREIGN PATENT DOCUMENTS

2098021A 11/1982 United Kingdom .
2204721A 11/1988 United Kingdom .

*Primary Examiner*—Robert B. Harrell
*Assistant Examiner*—Alpesh M. Shah
*Attorney, Agent, or Firm*—Limbach & Limbach

[57] ABSTRACT

An automatic memory sizer for a digital video recorder is provided. The sizer in accordance with the present invention automatically examines and configures available memory space for efficient storage of digital video information regardless of whether the memory consists of similar devices and/or storage capacities. By checking for selectively placed conductive jumpers on the circuit boards containing the memory devices, or by systematically writing test data into and reading it back out of the memory devices, the sizer in accordance with the present invention automatically determines the presence or absence of available memory assemblies and their respective relative data storage capacities. The sizer then establishes a hierarchy of available memory assemblies for pairing portions thereof based upon their respective relative data storage capacities, creates a memory address allocation table based upon such pairings for efficient accessing thereof, and writes incoming video data into the memory assemblies according to the allocation table.

10 Claims, 9 Drawing Sheets

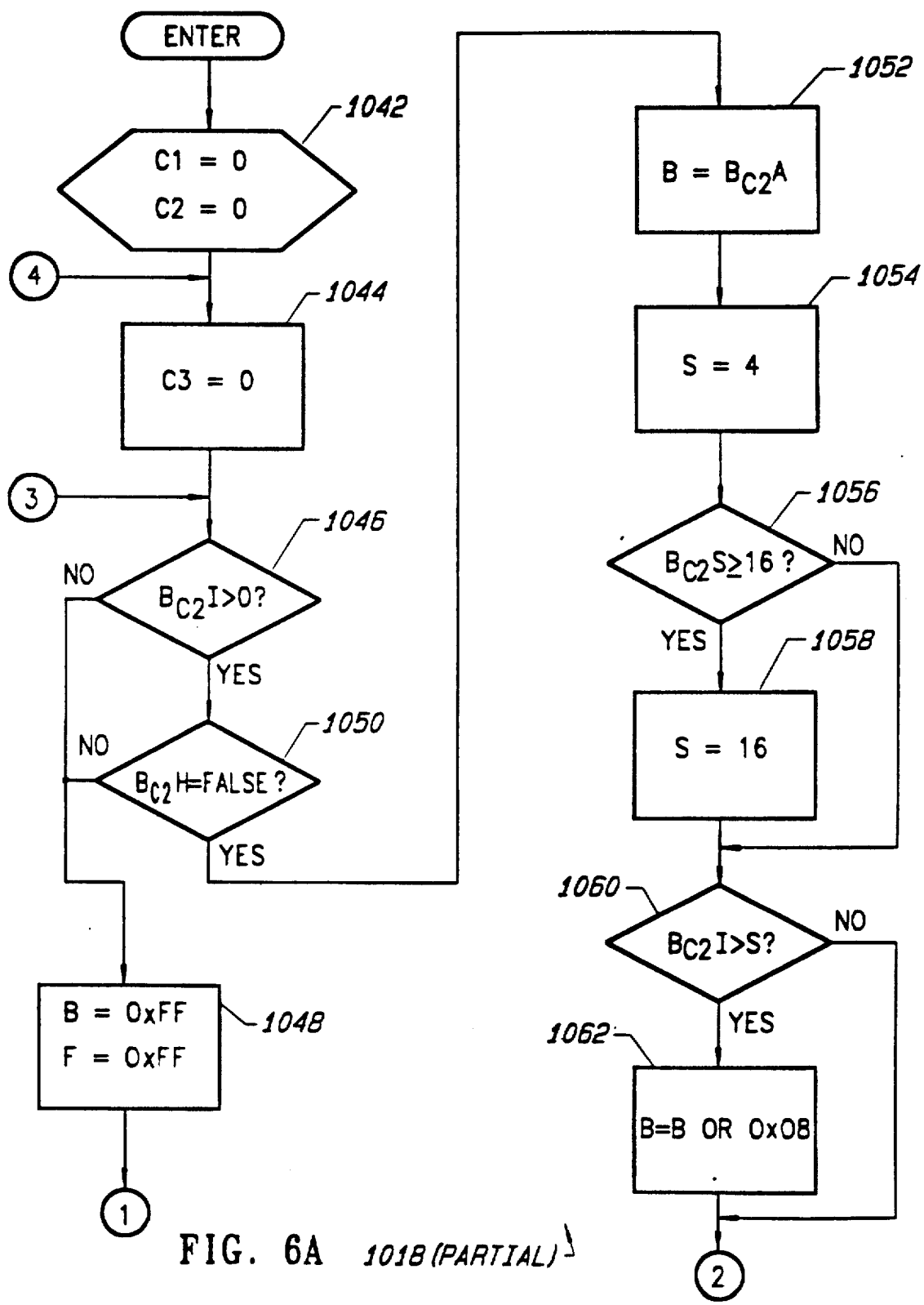
FIG. 6A  1018 (PARTIAL)

HIERARCHICALLY PAIRING MEMORY BLOCKS BASED UPON RELATIVE STORAGE CAPACITIES AND SIMULTANEOUSLY ACCESSING EACH MEMORY BLOCK WITHIN THE PAIRED MEMORY BLOCKS

BACKGROUND OF THE INVENTION

1. Field of the Invention

The present invention relates to digital memory circuits used to store binary encoded video information. In particular, the present invention relates to means for configuring and addressing such digital memory circuits so as to accommodate the use of multiple memory circuits having dissimilar storage capacities and to maximize the efficiency of such usage.

2. Description of the Related Art

With the rapid advancements in digital circuit technology, digital video recorders are now a reality. A digital video recorder differs from the popular video cassette recorder ("VCR") in that it records video information in a digitized, or binary encoded, format. This difference is critical to applications involving image processing because digital image processing usually provides image processing capabilities far more sophisticated than its analog image processing counterpart.

An example of where digital image processing plays a key role is that of a television receiver capable of providing a picture-in-a-picture ("PIP") video display. While viewing a normal video display with such a television receiver, a viewer can selectively introduce a second video display within a smaller, predefined area within the original video display. One use for this is where the television viewer, while watching one channel's programming as the main display, can selectively view another channel's programming via the smaller PIP display. Further background information on such television receivers can be found in Hakamada, U.S. Pats. Nos. 4,725,888, 4,746,983 and 4,761,688, and Hakamada et al., U.S. Pats. Nos. 4,729,027, 4,774,582 and 4,777,531.

One way to provide a PIP video display is to use a digital video recorder. The circuitry constituting the digital video recorder receives two analog video signals, where one constitutes the primary signal intended to be the main display and the other constitutes the secondary signal intended to be the PIP display. The digital video recorder digitizes these signals and stores them within its digital memory. This stored, digitized video information is subsequently read out in the appropriate manner to be converted back to analog video information and produce both a main display and the PIP display.

Depending upon such factors as the desired resolutions of the reproduced video displays and/or the potential time delays to be introduced in displaying the stored video information, more or less video information will need to be stored. For example, an NTSC standard video signal consists of successive "frames" of 525 lines made up of two interlaced "fields" of 262½ lines each. Furthermore, an NTSC standard video signal consists of 30 frames per second. Thus, as will be appreciated by one of ordinary skill in the art, depending upon the desired resolutions of the video displays and/or the potential time delays to be introduced, a greater or lesser number of frames will need to be stored. This in turn, translates to a potential need for a selectively variable storage capacity within the digital memory circuits within the digital video recorder.

It will be appreciated by one of ordinary skill in the art that one way to provide for this selective variability in storage capacity is to use multiple, interchangeable circuit card assemblies ("CCAs") to hold the digital memory devices used for storing the video information. By installing the appropriate CCAs, which in turn contain the appropriate digital memory devices, into the digital video recorder, selectively variable amounts of video information (e.g., video frames) can be stored and read out as desired.

Generally, a video data memory CCA uses a single memory address bus for writing and reading video data into and out from its memory, respectively. To have and use more than one memory address bus on a video data memory CCA would greatly increase the complexity of the wiring backplane and programming (i.e., software) necessary to handle dual memory address buses, particularly at the speeds at which the video data must be transferred.

Therefore, when video data is being written into memory locations in memory devices located on one video data memory CCA, other video data being read out simultaneously for a video display (or storage elsewhere) must be read out from corresponding memory locations in other memory devices located on a separate video data memory CCA. Thus, at least two video data memory CCAs are needed to allow incoming video data to be stored while previously stored video data is being read out for simultaneous, albeit time-delayed, display.

For example, a digital video recorder can use four video data memory CCAs, each having a storage capacity of up to 32 video frames, to store its video data. These four video data memory CCAs are paired together, with each pair used to simultaneously store and read out, as discussed above, video data representing up to double the number of video frames of which each video data memory CCA is capable of storing.

Of course, implicit in this is the requirement, or virtual requirement, that all four video data memory CCAs, or at least both within each pair, provide equal data storage capacities. If their storage capacities are not equal, then any additional storage capacity of the larger capacity video data memory CCA beyond that of the smaller capacity video data memory CCA will be unused, and therefore wasted. For example, if one video data memory CCA is capable of storing up to 16 video frames, while the others (or at least its mate) are capable of storing only up to eight video frames, then only eight video frames worth of its storage capacity will be used because of the simultaneous write and read operations, as discussed above.

Therefore, it would be desirable to have a digital video recorder which would allow for the installation and memory efficient use of multiple video data memory CCAs without regard for their respective data storage capacities. It would be further desirable to provide a means by which a digital video recorder could recognize and compensate for substitutions of video data memory CCAs having data storage capacities different from the remaining video data memory CCAs, while minimizing the amount of unused or wasted data storage capacity otherwise caused by such differences in relative data storage capacities.

SUMMARY OF THE INVENTION

An automatic memory sizer for a digital video recorder in accordance with the present invention programmably examines and configures available memory space within its video data memory circuit card assemblies ("CCAs") for efficient storage and retrieval of digital video data, regardless of whether the memory CCAs have similar data storage capacities. By checking for selectively placed conductive jumpers on the memory CCAs containing the memory devices, or by systematically writing test data into and reading it back out of the memory CCAs, the sizer electronically determines the presence or absence of available memory CCAs and their respective relative data storage capacities.

The sizer then establishes a hierarchy of the available memory CCAs by pairing portions thereof, based upon their respective relative data storage capacities. The sizer creates a memory address allocation table based upon such pairings for efficient addressing thereof by storing, in look-up table form, addressing information for simultaneously addressing corresponding memory locations in the paired video data memory CCAs for simultaneously writing and reading incoming and outgoing video data, respectively.

These and other objectives, features and advantages of the present invention will be readily understood upon consideration of the following detailed description of the invention and the accompanying drawings.

BRIEF DESCRIPTION OF THE DRAWINGS

Throughout the figures, corresponding elements therein are designated with like numerals.

FIGS. 6A-6B illustrate, in flow chart form, the basic operational steps used by an automatic memory sizer in accordance with the present invention to construct a memory address allocation table for addressing its video data memory circuit card assemblies.

DETAILED DESCRIPTION OF THE INVENTION

Figure 1:
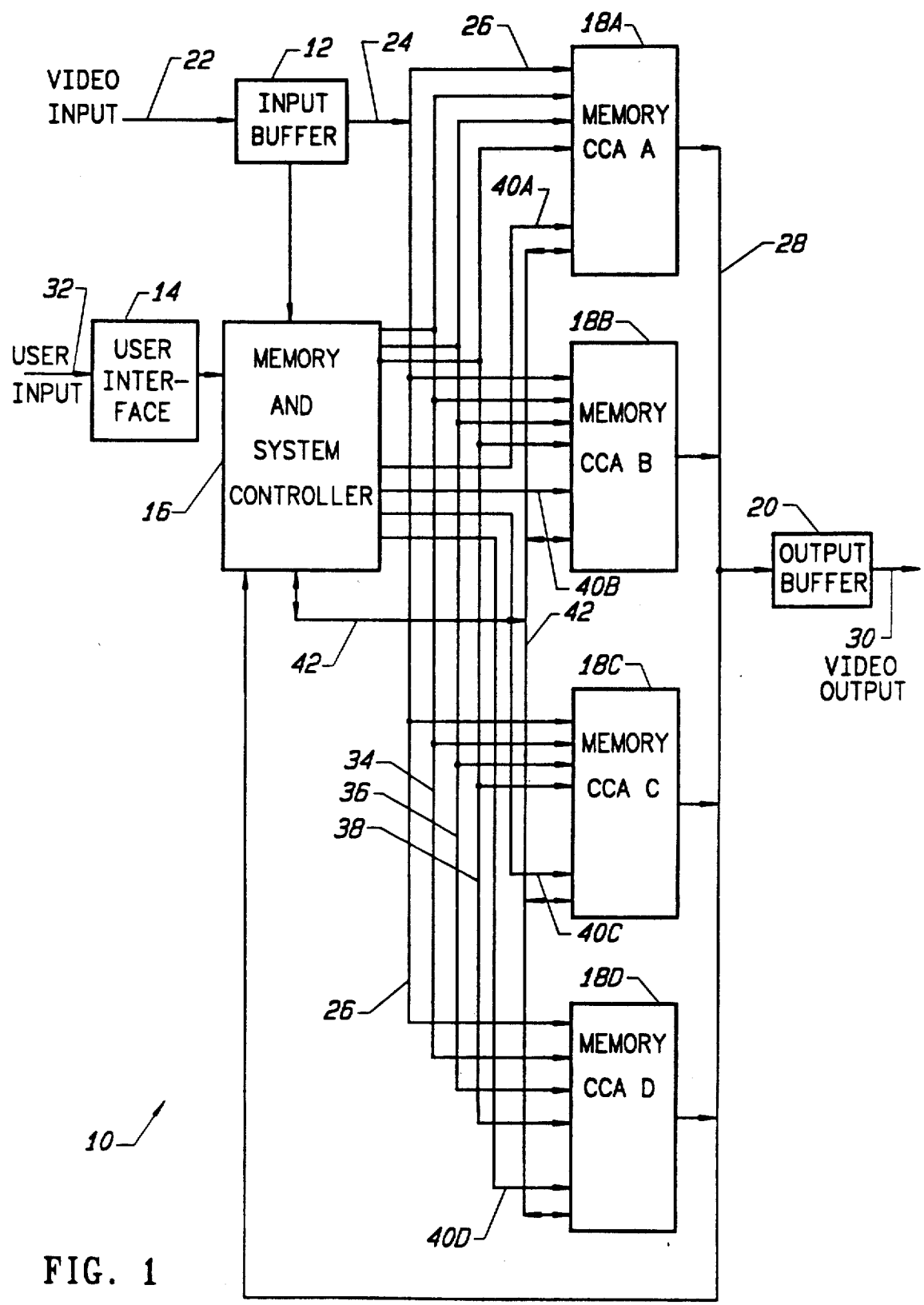
FIG. 1 illustrates, in simplified, functional block diagram form, a digital video recorder having an automatic memory sizer in accordance with the present invention.

Referring to FIG. 1, the basic elements for a digital video recorder 10 having an automatic memory sizer in accordance with the present invention are: an input buffer 12; a user interface 14; a memory and system controller 16; memory circuit card assemblies 18; and an output buffer 20.

Video information is inputted to the input buffer 12 as a video input signal 22. This video input signal 22 can consist of a composite video signal, analog red, green and blue ("RGB") video signals, or digital RGB video signals. If the video input signal 22 is a composite video signal, the input buffer 12 includes circuits for extracting the vertical and horizontal synchronization signals and converting the composite video signal to its RGB equivalents. Once the composite video signal has been converted to its RGB equivalents, or if the video input signal 22 was originally analog RGB video signals, these analog RGB video signals are digitized within the input buffer 12, and thereby converted to their digital RGB video signal equivalents.

The now digitized video signal 24 is outputted from the input buffer 12 onto the input video data bus 26. As explained more fully below, this digitized input video data is stored within the video data memory circuit card assemblies ("CCAs") 18. This stored video data is subsequently read out onto the output video data bus 28 for transfer to the output buffer 20.

The output buffer 20 outputs this video data as a video output signal 30. The video output signal 30 can be the digital RGB video signals, analog RGB video signals, or a composite video signal. If the video output signal 30 is desired as an analog signal, the output buffer 20 includes circuits, which are well known in the art, appropriate for making this conversion.

The memory and system controller 16 contains several types of digital circuits which are well known in the art, such as a microprocessor, read only memory ("ROM"), random access memory ("RAM"), digital registers and digital counters. It is within the programming of the microprocessor and its concomitant interaction with the aforementioned circuits within the memory and system controller 16 that the automatic memory sizer in accordance with the present invention is found. This programming of the microprocessor within the memory and system controller 16 can be accomplished by inserting the appropriately programmed ROM or by inputting the appropriate program steps via the user input signal 32 and user interface 14.

The memory and system controller 16 is programmed to configure the available memory space within the memory CCAs 18. The memory space within the memory CCAs 18 is configured such that two memory CCAs 18, or portions of each thereof, are paired with one another such that input video data 24 is being written into one of the input video data bus 26 while, simultaneously, output video data is being read out from the other on the output video data bus 28.

For example, the first memory CCA 18a and the second memory CCA 18b can be paired together, e.g., as "primary" 18a and "secondary" 18b memory CCAs, respectively. The video data writing and reading operations will alternate between these two memory CCAs 18a, 18b such that as two lines of new video input data 24 are being written into the primary memory CCA 18a, the previously stored two lines of video data in the secondary memory CCA 18b are being read out, and vice versa. This alternating, simultaneous writing and reading of video data in and from the memory CCAs 18a, 18b is programmably controlled by the memory and system controller 16.

The controller 16 outputs an appropriate bit pattern on the write address bus 34 and a correspondingly appropriate bit pattern on the read address bus 36. Decoding circuits located on the primary memory CCA 18a decode the bit pattern on the write address bus 34. Decoder circuits on the secondary memory CCA 18b decode the bit pattern on the read address bus 36. The controller 16 then strobes these memory CCAs 18a, 18b with individual strobe signals 40a, 40b, thereby activating the write and read operations, respectively, on the memory CCAs 18a, 18b.

In a preferred embodiment of the present invention, the addresses placed upon the write 34 and read 36 address buses consist of eight bits each, e.g., four "board" bits and four "frame" bits. The four board bits indicate which half of which memory CCA 18 is being addressed, and the four frame bits indicate which frame therein is being addressed. In other words, each memory CCA 18 is addressed as if it were two assemblies, or "boards," having up to 16 frames' worth of data storage capacity in each "board." Thus, the four board address bits indicate which memory CCA 18 and which half thereof is to be written into or read from. Similarly, the four frame address bits indicate which block, or frame's worth, of memory space within the designated board (see description for FIGS. 3A-3C below) is to be written into or read from.

After the primary memory CCA 18a has written two lines of input video data and the secondary memory CCA 18b has read out two lines of input video data, the write and read addresses's bit patterns are interchanged on the write 34 and read 36 address busses, thereby causing the next two lines of incoming video input data to be written into the secondary memory CCA 18b, while the previously stored two lines of video data are read out from the primary memory CCA 18a.

The video data being written into the primary memory CCA 18a via the input video data bus 26 is written into sequential memory locations within the primary memory CCA 18a. Correspondingly, video data being read out from the secondary memory CCA 18b with sequential memory locations which correspond to those in the primary memory CCA 18a into which video data is being written. This is accomplished by sequentially addressing the memory locations within the memory CCAs 18a, 18b into which the video data is being written into or read out from.

This sequential addressing is done by the memory and system controller 16 which places a sequentially incremented bit pattern on the pixel address bus 38. The address bit pattern placed on the pixel address bus 38 begins at a value which corresponds to the first memory location into which video data is to be either written into or read out from. Digital counters located in the memory and system controller 16 simply count up or down, thereby sequentially incrementing or decrementing, the pixel address bit pattern.

In a preferred embodiment of the present invention, the pixel address consists of 16 bits. These 16 bits indicate the corresponding memory locations within the "boards" and "frames" indicated by the write and read addresses, as described above.

This process whereby two lines of video data are written into a primary memory CCA 18a, while the out from a secondary memory CCA 18b, and vice versa, is repeated until an entire frame of video data has been written and read out. In turn, this is repeated until as many frames of video data have been written and read out as of which the memory CCA 18 with the smaller storage capacity is capable.

In other words, if one memory CCA 18a has a video data storage capacity of 32 frames and is paired with a memory CCA 18b having a video data storage capacity of 16 frames, this process is repeated until 16 frames of video data have been written and read out. This must be so, because the smaller memory CCA 18b has no more storage capacity with which the remaining 16 frames of storage capacity in the larger memory CCA 18a can be paired.

However, as explained more fully below, the remaining 16 frames of video data storage capacity in the larger memory CCA 18a can be paired with video data storage capacities existing within the other memory CCAs 18c, 18d. If this portion of the larger memory CCA 18a is paired with any of the remaining memory CCAs 18c, 18d, the write and read operations are controlled as described above by the memory and system controller 16 via the write address bus 34, read address bus 36, pixel address bus 38 and strobe signals 40a, 40c, 40d.

Configuration of the available video data memory space, i.e., pairing of the memory CCAs 18, is done by the memory and system controller 16. When pairing the memory CCAs 18, the controller 16 first determines the respective storage capacities of the memory CCAs 18 via a status bus 42. Each memory CCA 18 makes available to the controller 16, via the status bus 42, a status signal which indicates its video data storage capacity. Once the storage capacities are known (as explained below for FIG. 2), the controller 16 pairs the memory CCAs 18, or portions of each thereof, to maximize the usage of all available video data storage capacity (as explained below for FIGS. 3A-3C).

Figure 2:
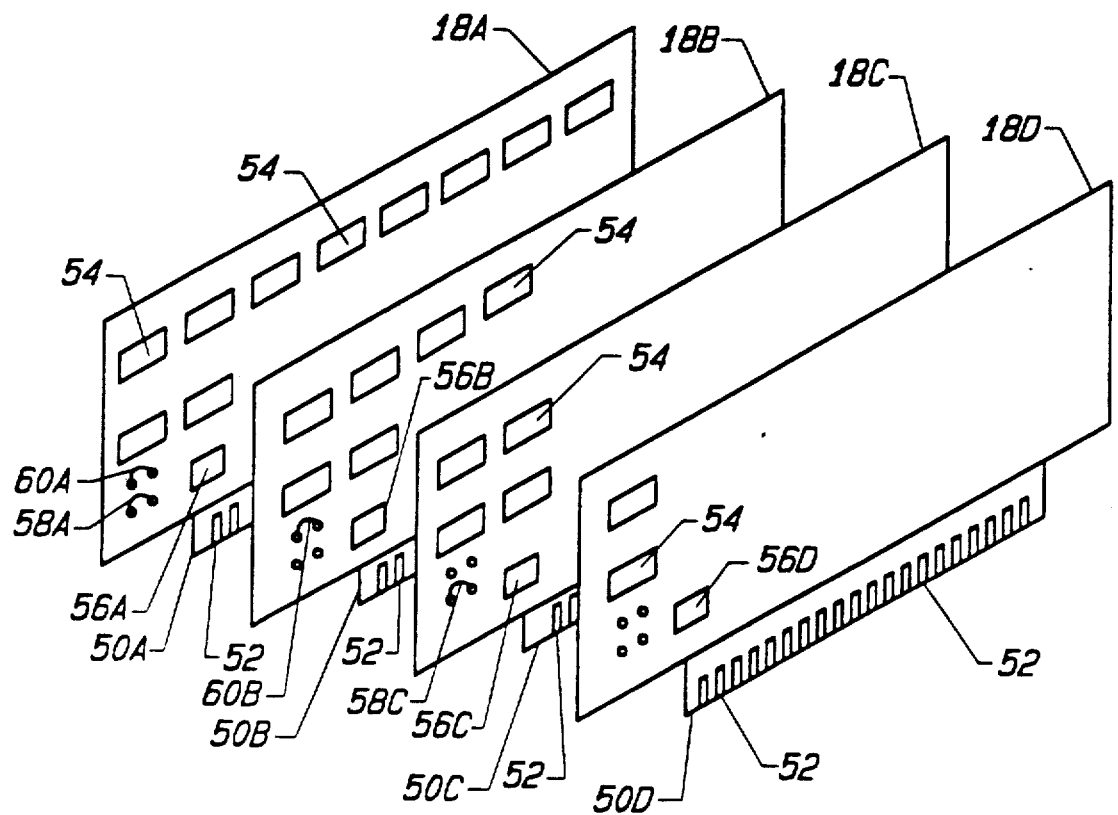
FIG. 2 illustrates, in simplified, perspective pictorial form, the video data memory circuit card assemblies for use in a digital video recorder having an automatic memory sizer in accordance with the present invention.

Referring to FIG. 2, the video data memory CCAs 18 consist of printed circuit boards on which edge connectors 50 can be installed to allow the memory CCAs 18 to be easily replaced. These edge connectors 50 have multiple conductive contacts 52 which provide for electrically coupling to the aforementioned data 26, address 34, 36, 38 and status 42 buses, as well as the strobe signals 40.

Installed upon each of the memory CCAs 18 are multiple memory devices, e.g., dynamic random access memories ("DRAMs") 54. These memory devices 54 provide the memory locations into which incoming video data is written and from which outgoing video data is read. Further installed upon the memory CCAs 18 are status registers 56. The status registers 56 are simply programmable digital registers which are programmed with status bits indicating the size, i.e., the data storage capacity, of their respective memory CCAs 18. These status registers 56 drive the status bus 42, thereby informing the memory and system controller 16 as to the data storage capacities of the memory CCAs 18, as described above.

These status registers 56 are programmed by installing, or not installing as the case can be, conductive jumpers 58, 60. When a conductive jumper 58, 60 is installed, it electrically couples two conductive pads on the memory CCA 18. By any of several means which are well known in the art, this electrical coupling of conductive pads can be made to represent a logical one or a logical zero which in turn can be used as a status bit with which the corresponding status register 56 is programmed. Similarly, the non-installation of a jumper 58, 60 can also, by several means well known in the art, be used to represent a logical zero or a logical one for programming the corresponding status register 56.

For the jumper 58, 60 configurations illustrated on the exemplary memory CCAs 18 in FIG. 2, the status bit patterns programmed by the jumpers 58, 60 for the four memory CCAs 18 can be represented by the bit patterns "11," "10," "01" and "00." The first status bit pattern "11" indicates that the first memory CCA 18a contains sufficient memory devices 54 to store up to 32 frames of video data. The second status bit pattern "10" indicates that the second memory CCA 18b contains sufficient memory devices 54 to store up to 16 frames of video data. The third status bit pattern "01" indicates that the third memory CCA 18c contains sufficient memory devices 54 to store up to 8 frames of video data. The last status bit pattern "00" indicates that the last memory CCA 18d contains sufficient memory devices 54 to store up to 4 frames of video data.

As will be appreciated by one of ordinary skill in the art, all four memory CCAs 18 can be outfitted with sufficient memory devices 54 to store up to 32, 16, 8 or 4 frames of video data, as desired, with the appropriate jumpers 58, 60 installed.

It will be further appreciated by one of ordinary skill in the art that means for determining the data storage capacities of the memory CCAs 18 other than electrical jumpers 58, 60 programming status registers 56 can be used. For example, test video data can be inputted to a memory CCA 18 via the input video data bus 26 and read back out via the output video data bus 28 to the memory and system controller 16 (see FIG. 1). By writing into and reading out from sequentially higher addressed memory locations within the memory CCA 18, the controller 16 can determine the maximum data storage capacity of the memory CCA 18.

Figure 3A:
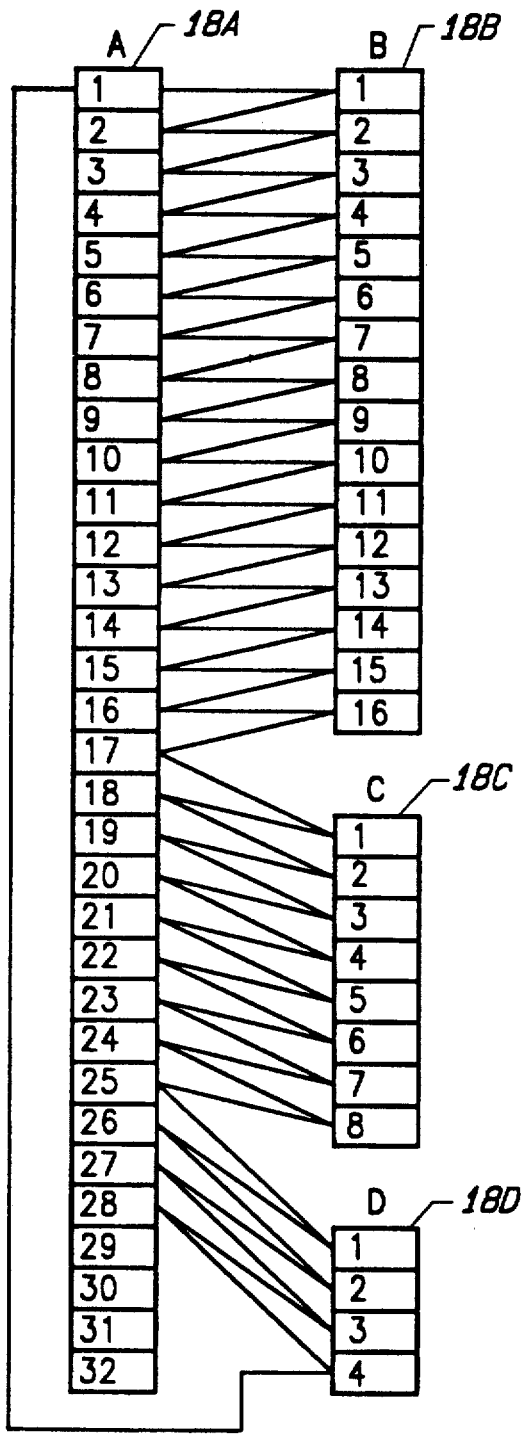
FIGS 3A-3D illustrate, in simplified, conceptual form, examples of hierarchical pairing of memory space within the video data memory circuit card assemblies of a digital video recorder having an automatic sizer in accordance with the present invention.
Figure 3B:
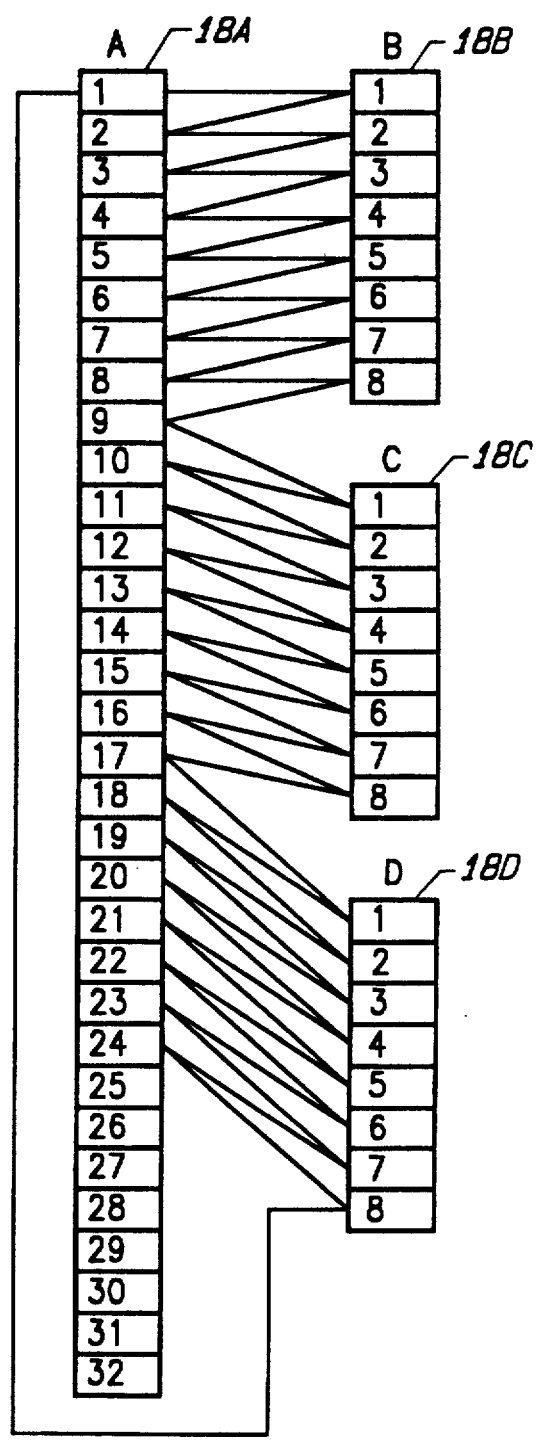
Figure 3C:
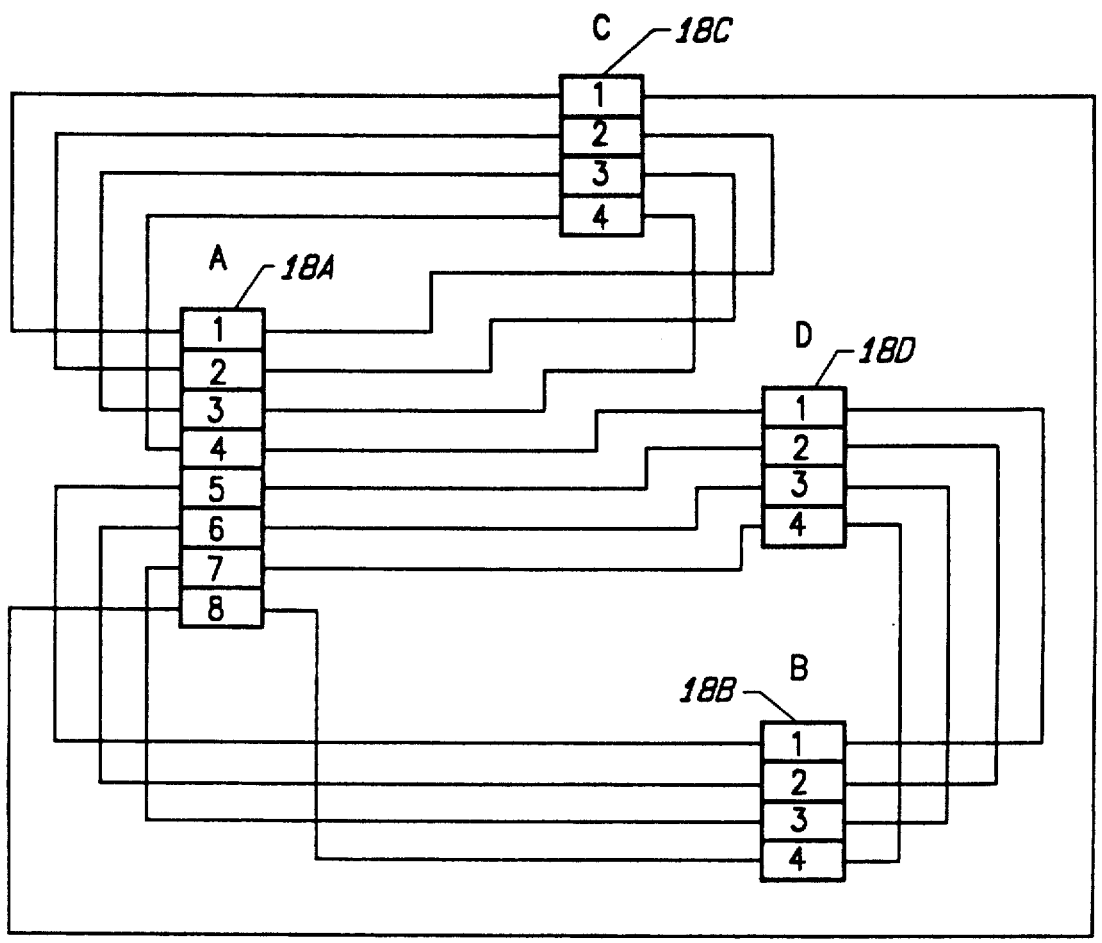

Once the memory and system controller 16 has determined the respective data storage capacities of the memory CCAs 18 via their status registers 56 and the status bus 42, the controller 16 programmably constructs a memory hierarchy by hierarchically pairing portions of the memory CCAs 18 (described more fully below). FIGS. 3A-3C illustrate conceptually how this memory hierarchy is constructed.

FIG. 3A illustrates the conceptual equivalents of the four memory CCAs 18a, 18b, 18c, 18d, designated as CCAs "A," "B," "C" and "D" with data storage capacities of 32, 16, 8 and 4 video frames, respectively, as illustrated in FIG. 2 and discussed above. The first memory CCA 18a is illustrated as a group of 32 blocks, or squares. Each block represents one video frame's worth of data storage capacity, i.e., one "frame" as described above. Similarly, the remaining memory CCAs 18b, 18c, 18d are represented by groups of 16, 8 and 4 blocks, respectively, each block representing one frame.

As discussed more fully below, the hierarchical pairings of the various portions of the memory CCAs 18 are done as "overlapped" pairings. The interconnecting lines indicate conceptually how the various portions of the memory CCAs 18 are paired in an overlapping manner to support the simultaneous write and read operations. As shown, the overlapped primary-secondary pairings of the memory CCAs 18 are as follows in Table 1:

TABLE 1

| CCA/Frame | |
|---|---|
| Primary | Secondary |
| A1 | B1 |
| B1 | A2 |

TABLE 1-continued

| CCA/Frame | |
|---|---|
| Primary | Secondary |
| A2 | B2 |
| B2 | A3 |
| A3 | B3 |
| B3 | A4 |
| A4 | B4 |
| B4 | A5 |
| A5 | B5 |
| B5 | A6 |
| A6 | B6 |
| B6 | A7 |
| A7 | B7 |
| B7 | A8 |
| A8 | B8 |
| A9 | B9 |
| B9 | A10 |
| A10 | B10 |
| B10 | A11 |
| A11 | B11 |
| B11 | A12 |
| A12 | B12 |
| B12 | A13 |
| A13 | B13 |
| B13 | A14 |
| A14 | B14 |
| B14 | A15 |
| A15 | B15 |
| B15 | A16 |
| A16 | B16 |
| B16 | A17 |
| A17 | C1 |
| C1 | A18 |
| A18 | C2 |
| C2 | A19 |
| A19 | C3 |
| C3 | A20 |
| A20 | C4 |
| C4 | A21 |
| A21 | C5 |
| C5 | A22 |
| A22 | C6 |
| C6 | A23 |
| A23 | C7 |
| C7 | A24 |
| A24 | C8 |
| C8 | A25 |
| A25 | D1 |
| D1 | A26 |
| A26 | D2 |
| D2 | A27 |
| A27 | D3 |
| D3 | A28 |
| A28 | D4 |
| D4 | A1 |
| A29 | (unused) |
| A30 | (unused) |
| A31 | (unused) |
| A32 | (unused) |

Figure 3D:
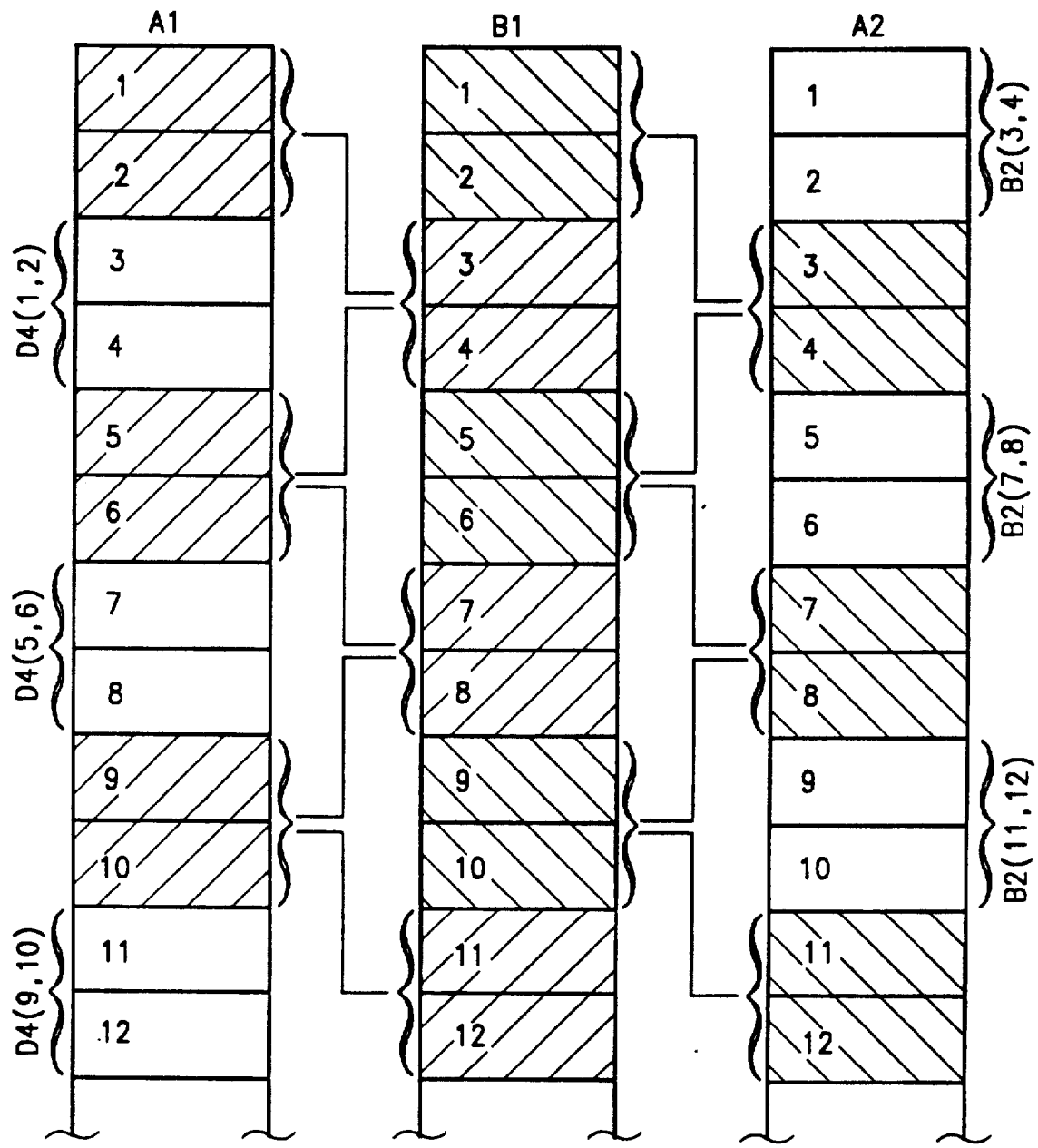

As stated above, the hierarchical pairings of the various portions of the memory CCAs 18 are done as "overlapped" pairings. This overlapped manner of pairing the memory CCAs 18 is illustrated in FIG. 3D for the exemplary memory pairings shown in FIG. 3A. The first frame A1 represents the first frame of the first memory CCA 18a, i.e., CCA "A." Similarly, the second B1 and third A2 frames represent the first and second frames of the second 18b and first 18a memory CCAs, i.e., CCAs "B" and "A," respectively. Each of the numbered areas (e.g., 1, 2, 3, ...) within each of these frames A1, B1, A2 represents one video line's worth of data storage capacity. Thus, the first two areas A1(1,2) within the first frame A1 are used to store the first two lines of a video frame.

For the example of FIGS. 3A and 3D, the first frame A1 of the first memory CCA 18a and the first frame B1 of the second memory CCA 18b are paired as "primary" and "secondary" frames, respectively. This "primary-secondary" designation means that as an incoming video frame is being stored within these memory CCAs 18a, 18b, alternating pairs of its lines are stored in corresponding memory locations, beginning with the first, i.e., "primary," frame A1. In other words, its first two lines are stored in the first two lines A1(1,2) of the first CCA 18a, its third and fourth lines are stored in the third and fourth lines B1(3,4) of the second CCA 18b, its fifth and sixth lines are stored in the fifth and sixth lines A1(5,6) of the first CCA 18a, and so on, as illustrated in FIG. 3D.

Similarly, the next video frame is stored in the first B1 and second A2 frames of the second 18b and first 18a memory CCAs, respectively, with the first frame B1 being the primary frame and the second frame A2 being the secondary frame. This overlapped manner of pairing primary and secondary "frames" and "lines" within the memory CCAs 18 is continued in accordance with the pairings listed in Table 1 above.

As will be recognized by one of ordinary skill in the art, the memory locations used to store incoming video lines need not correspond exactly to the video lines themselves. In other words, the first two video lines need not be actually stored in the first two lines' worth of memory, as defined by whatever addressing scheme is used, but instead can be stored in any area of memory. For example, the first actual two lines' worth of memory can be reserved for other uses, such as temporary storage of video test pattern data. Thus, the above references to the "first," "second," "third" and "fourth" lines' worth of memory are used as relative, and not absolute, terms.

FIG. 3B illustrates the example where memory CCA A has a storage capacity of 32 frames and each of the remaining memory CCAs B, C, D has a data storage capacity of eight frames. As shown, the overlapped primary-secondary pairings of the memory CCAs 18 are as follows in Table 2:

TABLE 2

| CCA/Frame | |
|---|---|
| Primary | Secondary |
| A1 | B1 |
| B1 | A2 |
| A2 | B2 |
| B2 | A3 |
| A3 | B3 |
| B3 | A4 |
| A4 | B4 |
| B4 | A5 |
| A5 | B5 |
| B5 | A6 |
| A6 | B6 |
| B6 | A7 |
| A7 | B7 |
| B7 | A8 |
| A8 | B8 |
| A9 | C1 |
| C1 | A10 |
| A10 | C2 |
| C2 | A11 |
| A11 | C3 |
| C3 | A12 |
| A12 | C4 |
| C4 | A13 |
| A13 | C5 |
| C5 | A14 |
| A14 | C6 |
| C6 | A15 |
| A15 | C7 |
| C7 | A16 |

TABLE 2-continued

| CCA/Frame | |
|---|---|
| Primary | Secondary |
| A16 | C8 |
| C8 | A17 |
| A17 | D1 |
| D1 | A18 |
| A18 | D2 |
| D2 | A19 |
| A19 | D3 |
| D3 | A20 |
| A20 | D4 |
| D4 | A21 |
| A21 | D5 |
| D5 | A22 |
| A22 | D6 |
| D6 | A23 |
| A23 | D7 |
| D7 | A24 |
| A24 | D8 |
| D8 | A1 |
| A25 | (unused) |
| A26 | (unused) |
| A27 | (unused) |
| A28 | (unused) |
| A29 | (unused) |
| A30 | (unused) |
| A31 | (unused) |
| A32 | (unused) |

FIG. 3C illustrates the example where memory CCa A has a storage capacity of eight frames and each of the remaining memory CCAs B, C, D has a data storage capacity of four frames. As discussed more fully below, since in this case no memory CCA 18 has sufficient memory capacity to be paired with all other memory CCAs 18, "staggered" overlapped pairing is used. As shown, the staggered overlapped primary-secondary pairings of the memory CCAs 18 are as follows in Table 3:

TABLE 3

| CCA/Frame | |
|---|---|
| Primary | Secondary |
| A8 | B4 |
| B4 | D4 |
| D4 | A7 |
| A7 | B3 |
| B3 | D3 |
| D3 | A6 |
| A6 | B2 |
| B2 | D2 |
| D2 | A5 |
| A5 | B1 |
| B1 | D1 |
| D1 | A4 |
| A4 | C4 |
| C4 | A3 |
| A3 | C3 |
| C3 | A2 |
| A2 | C2 |
| C2 | A1 |
| A1 | C1 |
| C1 | A8 |

In the preferred embodiment of the present invention in which the write and read addresses each consist of eight bits (e.g., four "board" bits and four "frame" bits), as described above, each "board" consists of up to 16 "frames." Thus, in the example of FIG. 3A, the first memory CCA 18a contains two boards having 16 frames each; the second memory CCA 18b contains one board having 16 frames; the third memory CCA 18c contains one board having eight frames; and the fourth memory CCA 18d contains one board having four frames. In the example of FIG. 3B, the first memory CCA 18a contains two boards having 16 frames each, and the second 18b, third 18c and fourth 18d memory CCAs each contain one board having eight frames each. In the example of FIG. 3C, the first memory CCA 18a contains one board having eight frames, and the second 18b, third 18c and fourth 18d memory CCAs each contain one board having four frames each.

Referring to FIG. 3A, when establishing the memory hierarchy and one of the memory CCAs 18 contains sufficient memory capacity to be paired with the memory capacities of all other memory CCAs 18 combined, the memory and system controller 16 begins with the largest capacity memory CCA 18a and pairs it with the second largest capacity memory CCA 18b. This results in the memory capacity (B1-B16) of the second largest memory CCA 18b being used in conjunction with a corresponding amount of memory (A1-A16) within the larger memory CCA 18a to support the simultaneous write and read operations.

The controller 16 then pairs the next smaller capacity memory CCA 18c with the first memory CCA 18a. Therefore again, the storage capacity (C1-C8) of this smaller capacity memory CCA 18c is used in conjunction with a corresponding capacity (A17-A24) within the larger capacity memory CCA 18a for supporting the simultaneous write and read operations.

The fourth, and final, memory CCA 18d is then paired with the first memory CCA 18a. Their respective and corresponding storage capacities (D1-D4, A25-A28) are used together to support the simultaneous write and read operations. Since the total memory capacity of the smaller memory CCAs 18b, 18c, 18d is less than that of the largest memory CCA 18a, some memory capacity (A29-A32) goes unused.

For the example illustrated in FIG. 3B, the first memory CCA 18a is again the largest in terms of data storage capacity. Therefore, as before, the controller 16 begins with this memory CCA 18a. However, in the example illustrated in FIG. 3B, the remaining memory CCAs 18b, 18c, 18d are of equal data storage capacities. Therefore, they can be paired in any arbitrary order with similarly sized portions of the first memory CCA 18a, as illustrated in FIG. 3B. As in the case of FIG. 3A, a portion (A25-A32) of the first memory CCA 18a goes unused due to a lack of further data storage capacity on the other memory CCAs 18b, 18c, 18d.

For the example illustrated in FIG. 3C, the pairings of the memory CCAs 18 cannot be accomplished as simply. As will be recognized by referring to FIG. 3C, if each of the memory CCAs 18 were merely paired with only one other memory CCA 18, e.g., CCAs A-B and CCAs C-D, although all available memory capacity on CCAs C and D would be used, fully half of the memory capacity of CCA A would go unused. Therefore, "staggered" overlapped pairing of the memory CCAs 18 is done. As shown for the example of FIG. 3C, this results in CCA A being paired with three CCAs (B, C, D), CCA B being paired with two CCAs (A, D) and CCA C being paired with only one CCA (A). Such staggered pairing provides for the pairing of all available memory capacity, and is possible because of the fact that the memory capacities of the CCAs 18 (i.e., 32, 16, 8 and 4 frames) are a series of binary multiples.

As will be appreciated by one of ordinary skill in the art, numerous permutations of possible data storage capacities exist among the four memory CCAs 18. However, by programming the memory and system controller 16 to begin with the largest capacity memory CCA 18 and pairing it, or portions thereof, in overlapped pairings with successively smaller capacity memory CCAs 18, or alternatively, pairing the memory CCAs 18 in staggered overlapped pairings, efficient pairings of data storage capacities are accomplished, while supporting the simultaneous video data write and read operations and minimizing the amount of unused, and therefore wasted, video data storage capacity.

As will be further appreciated by one of ordinary skill in the art, this hierarchical pairing of the memory CCAs 18 by the memory and system controller 16 is preferably done immediately following initial power-up of the digital video recorder 10. By programming the controller 16 to perform this hierarchical pairing immediately upon system power-up, performance of the digital video recorder 10 will be optimized immediately. In other words, even if some or all of the memory CCAs 18 have been replaced with other memory CCAs 18 having different, or smaller, data storage capacities, by performing the hierarchical pairing of the memory CCAs 18 immediately upon system power-up, the memory and system controller 16 optimizes performance of the digital video recorder based upon the data storage capacities of the memory CCAs 18 presently installed.

Figure 4:
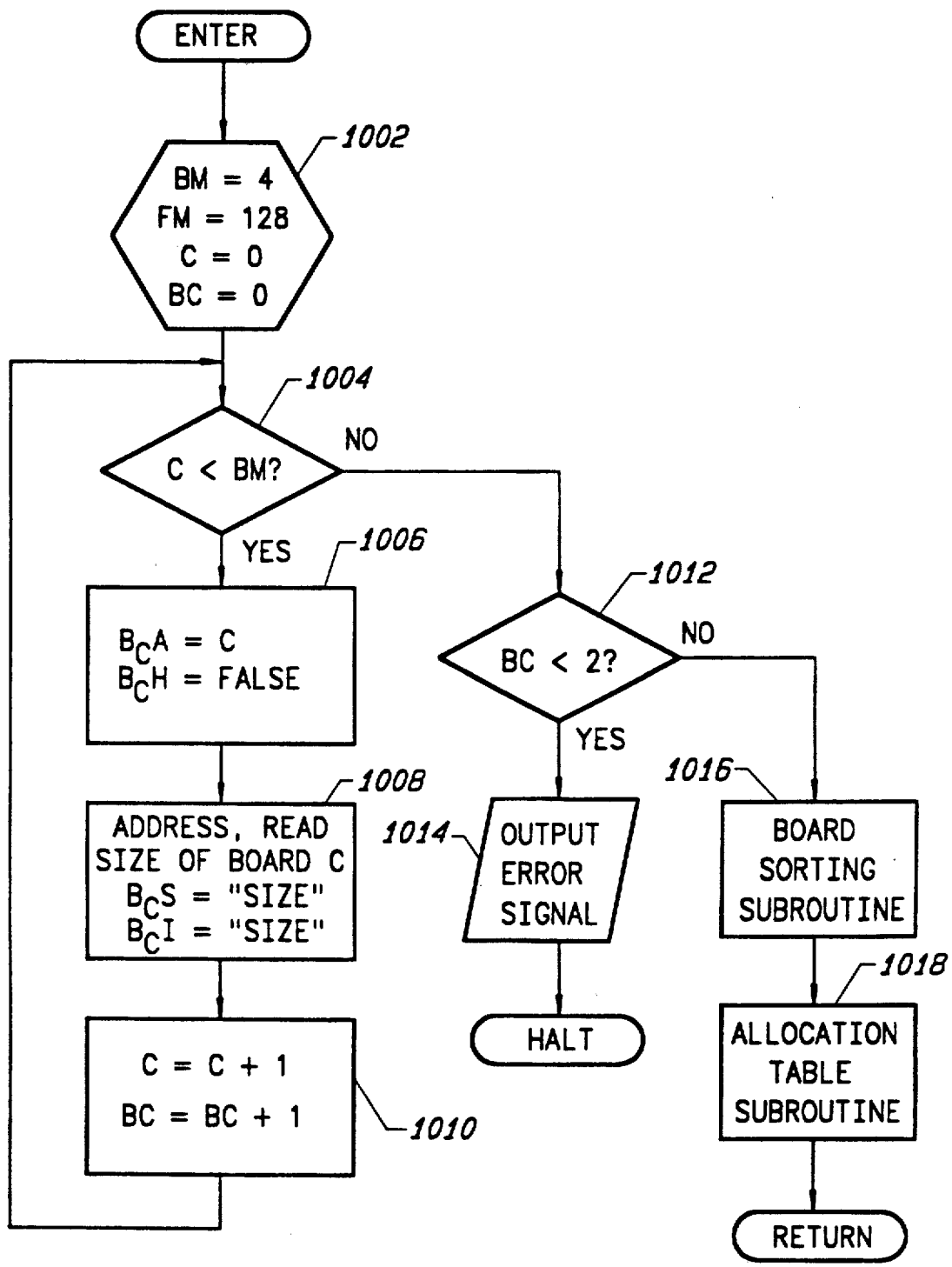
FIG. 4 illustrates, in flow chart form, the basic operational steps used by an automatic memory sizer in accordance with the present invention to determine the, number of and memory capacities of its video data memory circuit card assemblies.

FIGS. 4, 5 and 6A-6B illustrate, in flow chart form, the basic operational steps used by an automatic memory sizer in accordance with the present invention. Referring to FIG. 4, the first subroutine 1000 determines the number of and data storage capacities of the memory CCAs 18. The first step 1002 is to initialize some program constants. The maximum number BM of boards, i.e., memory CCAs 18, is initialized at four and the maximum number FM of frames is initialized at 128. A loop counter C is initialized at zero and a board count variable BC is initialized at zero.

As discussed above, a preferred embodiment of a digital video recorder 10 having an automatic memory sizer in accordance with the present invention has a maximum of four memory CCAs 18. With a maximum frame capacity of 32 frames per memory CCA 18 in the preferred embodiment, the maximum frame storage capacity is 128 frames. Therefore, in such a preferred embodiment, the maximum number BM of boards is four and the maximum number of frames FM is 128. However, as will be recognized by one of ordinary skill in the art, these maximums BM, FM are not mandatory and can be adjusted as desired.

The next step 1004 is to determine whether or not the loop counter C is less than the maximum number BM of boards. Initially the answer to this question will be yes and operation will continue with the following step 1006. This step 1006 sets the board address $B_cA$ equal to the value of the loop counter C and sets the board hold flag $B_cH$ (discussed more fully below) in its false state for this board C, i.e., for the memory CCA 18 having board address "C."

The next step 1008 is to address and read the size, i.e., the data storage capacity in frames, of this board C. As described above, this is done by looking to see which conductive jumpers 58, 60, if any, have been installed on the board C. The board size parameter $B_cS$ for this board C is set equal to the measured value of its data storage capacity. The board index $B_cI$ for this board C is also set equal to this value. As described above, the resulting board size parameter $B_cS$ (and index $B_cI$) will be one of the series of binary multiples 32, 16, 8 or 4.

Collectively, the board address parameter $B_cA$, board hold flag $B_cH$, board size parameter $B_cS$ and board index $B_cI$ make up a board parameter vector $B_c$ which characterizes the board C for the purposes of hierarchically pairing and addressing the memory CCAs 18.

The next step 1010 is to increment the loop counter C by one and increment the board count variable BC by one. However, this incrementing of the board count variable BC is done only if the board size parameter $B_cS$ represents a proper board size, in this case that being among the binary multiples of 32, 16, 8 or 4 frames.

The foregoing steps 1004, 1006, 1008, 1010 are repeated until the loop counter C is no longer less than the maximum number BM of boards. At that point, the next step 1012 is to determine whether the board count variable BC is less than two. If it is, this is an improper condition and the next step 1014 is to output an error signal of some form to indicate that an insufficient number of memory CCAs 18 has been installed into the digital video recorder 10.

Figure 5:
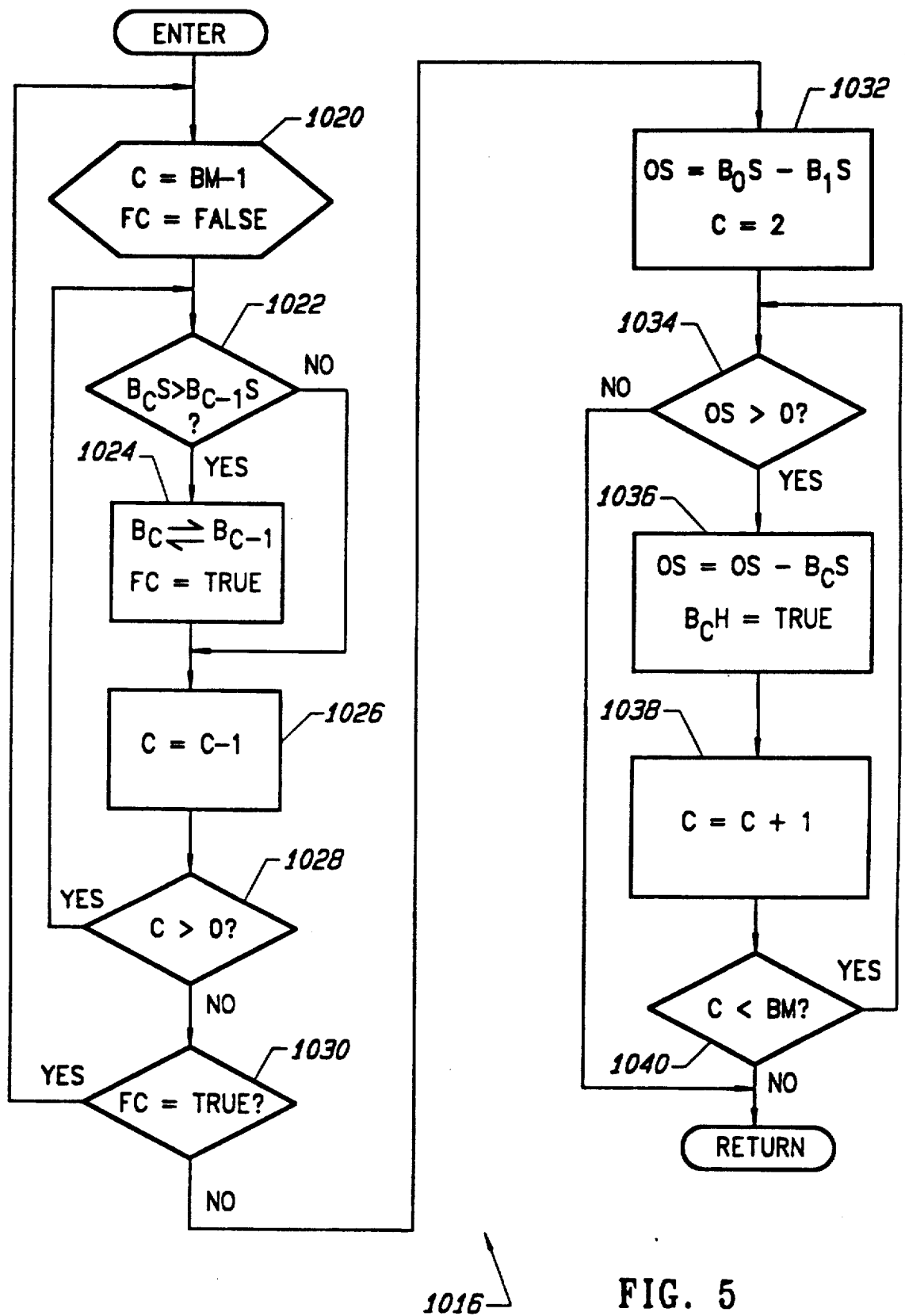
FIG. 5 illustrates, in flow chart form, the basic operational steps used by an automatic memory sizer in accordance with the present invention to sort its video data memory circuit card assemblies according t memory capacities.
Figure 6B:
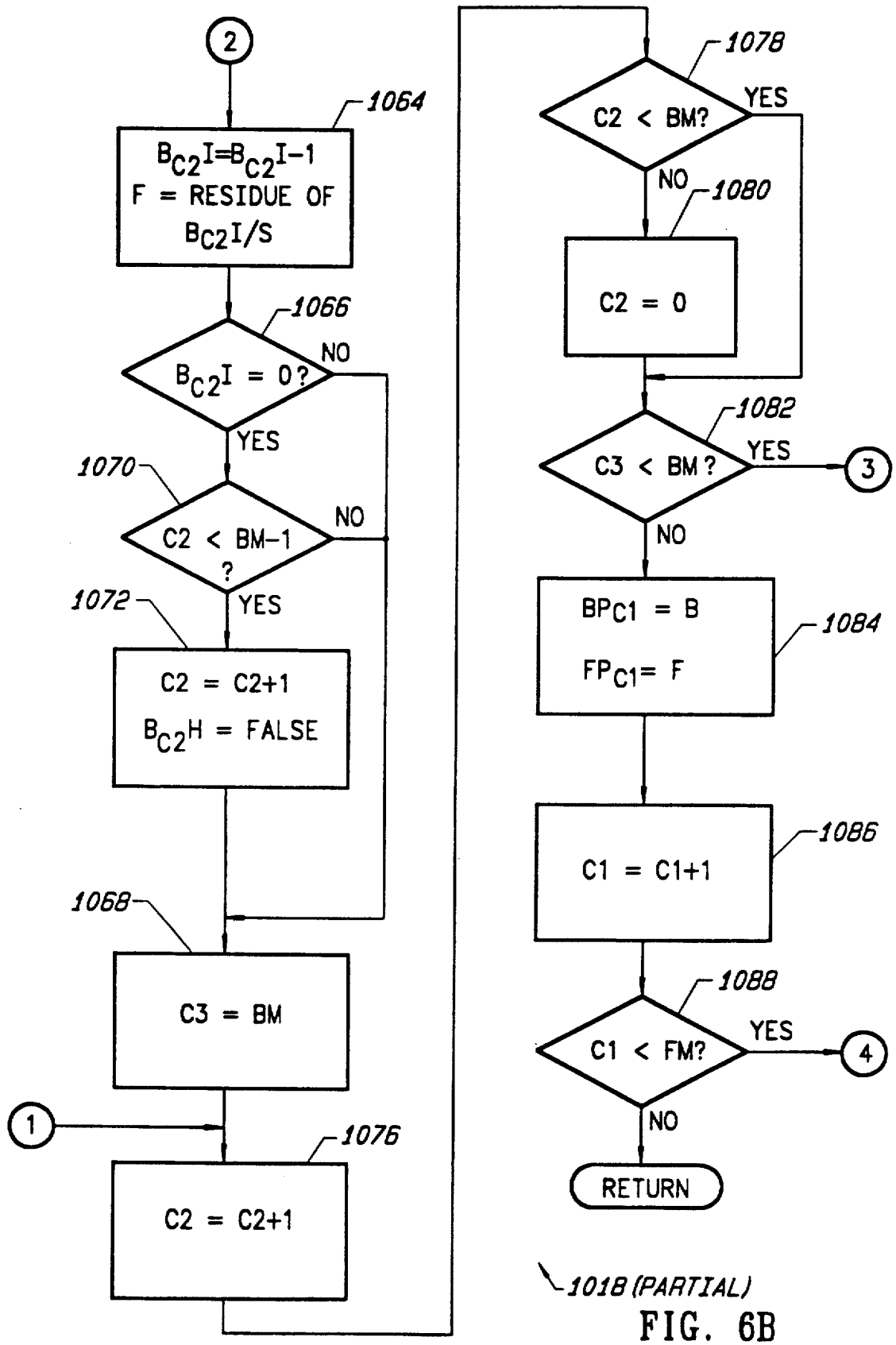

However, if the board count variable BC is equal to or greater than two, the next step 1016 is to perform the board sorting subroutine, as shown in FIG. 5. Upon completing the board sorting subroutine 1016, the next step 1018 is to perform the allocation table subroutine, as shown in FIGS. 6A-6B.

As explained more fully below, the board sorting subroutine 1016 sorts the memory CCAs 18 according to their respective data storage capacities so that the memory CCA 18 having the largest data storage capacity occupies the highest position within the memory hierarchy as defined by the allocation table, with successively smaller capacity memory CCAs 18 occupying successively less significant hierarchy positions. As explained more fully below, the allocation table subroutine 1018 constructs the memory address allocation table used for hierarchically pairing and addressing the memory CCAs 18.

Referring to FIG. 5, the board sorting subroutine 1016 begins with the step 1020 of initializing a loop counter C at a value of one less than the maximum number BM of boards. Additionally, a change flag FC is set to its false state (discussed more fully below).

The next step 1022 is to determine whether or not the board size $B_cS$ for this board C is greater than the board size $B_{c-1}S$ for the immediately adjacent board C-1. If the answer is yes, the next step 1024 is to exchange the corresponding board parameter vectors $B_c$, $B_{c-1}$ and set the change flag FC to its true state. The setting of the change flag FC to its true state serves to indicate that board parameter vectors $B_c$, $B_{c-1}$ have been exchanged. If the answer is no, this step 1024 is skipped.

The following step 1026 is to decrement the loop counter C by one.

The next step 1028 is to determine whether the loop counter C is still greater than zero. If the answer is yes, operation resumes with the step 1022 of comparing the board sizes $B_cS$, $B_{c-1}S$ of the board C and its adjacent board C-1. If the answer is no, the next step 1030 is to determine whether the change flag FC has been set to its true state to ascertain whether any board parameter vectors $B_c$, $B_{c-1}$ have been exchanged.

If the change flag FC is true, operation resumes with the first step 1020, wherein the loop counter and change flag FC are initialized. If the change flag FC is false, thereby indicating that the memory CCAs 18 have been hierarchically positioned according to their respective board sizes $B_cS$, operation continues with the following step 1032 The next step 1032 is to compute a memory size offset OS by subtracting the value of the board size $B_1S$ for board one from the board size $B_0S$ for board zero. Additionally, the loop counter C is set at a value of two.

The next step 1034 is to determine whether the computed memory size offset OS is greater than zero. If the answer is no, no further steps are performed within this subroutine. If the answer is yes, the computed memory size offset OS is reduced by a value equal to the board size $B_cS$ for this board C. Additionally, the board hold flag $B_cH$ is set to its true state. As discussed above, this causes the memory on this board C not to be allocated, i.e., paired with memory on another board, until last.

The next step 1038 is to increment the loop counter C by one, followed by the step 1040 of determining whether the loop counter C is still less than the maximum number BM of boards. If not, execution of this subroutine ceases and operation returns to the main subroutine (see FIG. 4). However, if the answer is yes, operation resumes with the step 1034 of determining whether the memory size offset OS is greater than zero.

Once execution of the board sorting subroutine 1016 has been completed, the allocation table subroutine 1018 is executed, as shown in FIGS. 4 and 6A.

Referring to FIG. 6A, the first step 1042 is to initialize a first loop counter C1 at zero and a second loop counter C2 at zero, followed by the step 1044 of initializing a third loop counter C3 at zero.

The next step 1046 is to determine whether the board index $B_{c2}I$ (for board C2) is greater than zero. If the answer is no, the next step 1048 is to set a temporary board address variable B equal to "FF" (hexadecimal) and a temporary frame number variable F to "FF" (hexadecimal).

However, if the board index $B_{c2}I$ is greater than zero, the next step 1050 is to then determine whether the board hold flag $B_{c2}H$ is set to its false state. If not, the next step 1048 is to set the temporary board address B and frame number F variables to "FF" (hexadecimal).

However, if the board hold flag $B_{c2}H$ is false, the next step 1052 is to set the temporary board address variable B equal to the board address $B_{c2}A$.

The following step 1054 is to set a step variable S equal to four.

The next step 1056 is to determine whether the board size $B_{c2}S$ is greater than or equal to 16 frames. If it is, the next step 1058 is to reset the step variable S to a value of 16 frames. If not, this step 1058 is skipped.

The next step 1060 is to determine whether the board index $B_{c2}I$ is greater than the step variable S. If it is, the next step 1062 is to set the fourth bit in the temporary board address variable B by performing a logical "OR" operation between its current value and the value "08" (hexadecimal). If not, this step 1062 is skipped.

Referring to FIG. 6B, the next step 1064 is to decrement the value of the board index $B_{c2}I$ by one and set the temporary frame number variable F at a value equal to the remainder of the quotient (i.e., "residue") of the board index $B_{c2}I$ divided by the step size S.

The next step 1066 is to determine whether the board index $B_{c2}I$ is equal to zero. If it is not, the next step 1068 is to reset the third loop counter C3 equal to the maximum number BM of boards. However, if the board index $B_{c2}I$ is equal to zero, the next step 1070 is to determine whether the second loop counter C2 is less than the value of the maximum number BM of boards decremented by one. If the answer is no, the next step 1068 is to reset the third loop counter C3. If the answer is yes, the next step 1072 is to increment the value of the second loop counter C2 by one and set the board hold flag $B_{c2}H$ to its false state.

The next step 1068 is to set the third loop counter C3 equal to the maximum number BM of boards, followed by the step 1076 of incrementing the second loop counter C2 by one.

The next step 1078 is to determine whether the value Of the second loop counter C2 is less than the maximum number BM of boards. If it is not, the next step 1080 is to reset the value of the second loop counter C2 at zero. If it is, this step is skipped.

The next step 1082 is to determine whether the value of the third loop counter C3 is less than the maximum number of BM of boards. If it is, operation resumes with the step 1046 (see FIG. 6A) of determining whether the board index $B_{c2}I$ is greater than zero.

However, if the value of the third loop counter C3 is not less than the maximum number BM of boards, the next step 1084 is to set the board address $BP_{c1}$ equal to the temporary board address variable B and the frame number $FP_{c1}$ equal to the temporary frame number variable F.

The next step 1086 is to increment the first loop counter C1 by one.

The last step 1088 is to determine whether the value of the first loop counter C1 is less than the maximum number FM of frames. If it is not, execution of this subroutine 1018 is complete. However, if it is, operation resumes with the step 1044 (see FIG. 6A) of setting the value of the third loop counter C3 equal to zero.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A method for allocating data storage capacity within a plurality of memory circuits for efficiently storing data therein, comprising the steps of:

electrically sensing a data storage capacity available within each one of a plurality of memory circuits, wherein each one of the memory circuit data storage capacities includes at least one memory block and has a relative storage capacity with respect to the remaining memory circuit data storage capacities;

hierarchically pairing memory blocks within two different ones of the plurality of memory circuits according to the relative storage capacities of each one of the plurality of memory circuits by generating and storing addresses in an address memory which correspond to the paired memory blocks within the plurality of memory circuits, thereby creating an address allocation table which contains addresses for addressing the paired memory blocks within the plurality of memory circuits according to a hierarchy;

receiving data; and hierarchically storing the received data while simultaneously writing and reading previously stored data into and out from, respectively, the paired memory blocks within the plurality of memory circuits according to the address allocation table.

2. A method as recited in claim 1, wherein the step of electrically sensing a data storage capacity available within each one of a plurality of memory circuits comprises electrically sensing an existence and placement of at least one conductive jumper in each one of the plurality of memory circuits.

3. A method as recited in claim 1, wherein the step of electrically sensing a data storage capacity available within each one of a plurality of memory circuits comprises storing test data into and reading the stored test data out from successively incremented memory locations within each one of the plurality of memory circuits.

4. A method as recited in claim 1, wherein the step of hierarchically pairing memory blocks within two different ones of the plurality of memory circuits according to the relative storage capacities of each one of the plurality of memory circuits comprises pairing a memory block within the memory circuit having a largest relative storage capacity with a memory block within the memory circuit having a next largest relative storage capacity, and the allocation table contains addresses which correspond to memory locations within the memory circuit having the next largest relative storage capacity and further contains addresses which correspond to a substantially equivalent number of memory locations within the memory circuit having the largest relative storage capacity.

5. A method as recited in claim 1, wherein the step of hierarchically storing the received data while simultaneously writing and reading previously stored data into and out from, respectively, the paired memory blocks within the plurality of memory circuits according to the address allocation table comprises storing data into the first one of a paired pair of memory blocks while simultaneously reading out previously stored data from the second one of the paired pair of memory blocks.

6. A computer programmed for allocating data storage capacity within a plurality of memory circuits for efficiently storing data therein, wherein the computer is programmed to perform the steps of:

electrically sensing a data storage capacity available within each one of a plurality of memory circuits, wherein each one of the memory circuit data storage capacities includes at least one memory block and has a relative storage capacity with respect to the remaining memory circuit data storage capacities;

hierarchically pairing memory blocks within two different ones of the plurality of memory circuits according to the relative storage capacities of each one of the plurality of memory circuits by generating and storing addresses in an address memory which correspond to the paired memory blocks within the plurality of memory circuits, thereby creating an address allocation table which contains addresses for addressing the paired memory blocks within the plurality of memory circuits according to a hierarchy;

receiving data; and hierarchically storing the received data while simultaneously writing and reading previously stored data into and out from, respectively, the paired memory blocks within the plurality of memory circuits according to the address allocation table.

7. A computer as recited in claim 6, wherein the program step of electrically sensing a data storage capacity available within each one of a plurality of memory circuits comprises electrically sensing an existence and placement of at least one conductive jumper in each one of the plurality of memory circuits.

8. A computer as recited in claim 6, wherein the program step of electrically sensing a data storage capacity available within each one of a plurality of memory circuits comprises storing test data into and reading the stored test data out from successively incremented memory locations within each one of the plurality of memory circuits.

9. A computer as recited in claim 6, wherein the program step of hierarchically pairing memory blocks within two different ones of the plurality of memory circuits according to the relative storage capacities of each one of the plurality of memory circuits comprises pairing a memory block within the memory circuit having a largest relative storage capacity with a memory block within the memory circuit having a next largest relative storage capacity, and the allocation table contains addresses which correspond to memory locations within the memory circuit having the next largest relative storage capacity and further contains addresses which correspond to a substantially equivalent number of memory locations within the memory circuit having the largest relative storage capacity.

10. A computer as recited in claim 6, wherein the program step of hierarchically storing the received data while simultaneously writing and reading previously stored data into and out from, respectively, the paired memory blocks within the plurality of memory circuits according to the address allocation table comprises storing data into the first one of a paired pair of memory blocks while simultaneously reading out previously stored data from the second one of the paired pair of memory blocks.

* * * * *